United States Patent [19]

Young et al.

[11] 4,237,083
[45] Dec. 2, 1980

[54] PROCESS OF MANUFACTURING A MICROPOROUS SHEET MATERIAL

[75] Inventors: James Young; Charles H. Geissel, both of Corvallis; Piotr Zenczak, Philomath, all of Oreg.

[73] Assignee: Evans Products Company, Portland, Oreg.

[21] Appl. No.: 11,900

[22] Filed: Feb. 13, 1979

Related U.S. Application Data

[63] Continuation of Ser. No. 865,413, Dec. 29, 1977, abandoned.

[51] Int. Cl.³ .............................................. B29D 27/00
[52] U.S. Cl. ................................ 264/41; 260/31.8 M; 260/31.8 PQ; 260/42.15; 260/42.37; 264/45.3; 264/179; 264/DIG. 17; 521/62; 521/64
[58] Field of Search .......... 264/49, 41, 45.3, DIG. 17, 264/179; 429/252, 254; 521/62, 64; 260/42.15, 42.37, 31.8 M, 31.8 PQ

[56] References Cited

U.S. PATENT DOCUMENTS

| 3,228,896 | 1/1966 | Canterino et al. ................ 264/49 X |
| 3,351,495 | 11/1967 | Larsen et al. ..................... 264/49 X |
| 3,536,796 | 10/1970 | Rock ..................................... 264/49 |
| 3,931,067 | 1/1976 | Goldberg et al. ............ 260/42.15 X |
| 4,024,323 | 5/1977 | Versteega ....................... 429/252 X |

FOREIGN PATENT DOCUMENTS

| 1044028 | 9/1966 | United Kingdom ...................... 264/49 |
| 1044502 | 10/1966 | United Kingdom ...................... 264/49 |

*Primary Examiner*—Philip Anderson
*Attorney, Agent, or Firm*—Robert E. Howard

[57] ABSTRACT

A process of manufacturing a microporous sheet by forming a blend of a polyolefin, silica and a water insoluble plasticizer, forming a sheet from the blend, and contacting the sheet with water for a time sufficient to render the sheet microporous. The plasticizer, being essentially insoluble in water, is easily separated therefrom and recycled. The preferred plasticizers are dialkyl phthalates and dialkyl adipates having between about two and about eleven carbon atoms in the oxo-alcohol moiety.

14 Claims, No Drawings

PROCESS OF MANUFACTURING A MICROPOROUS SHEET MATERIAL

This is a continuation of application Ser. No. 865,413, filed Dec. 29, 1977 now abandoned.

BACKGROUND OF INVENTION

The present invention relates to a process of manufacturing a microporous sheet material which may be used as a filter, packaging film, or other uses where a microporous sheet material is desired. The preferred use of the microporous sheet material produced by the process disclosed herein is as a battery separator.

Battery separators are porous diaphragms placed between the positive and negative plates of a battery so that the electrolyte forms the sole internal conducting path between them. Such separators may have smooth surfaces on one or both sides, or have ribs or dimples on one or both sides.

It is considered desirable in the battery separator art to employ the smallest possible pore size since this reduces the danger of active materials being forced through or going through the separator thereby causing shorting between the plates thereof or other detrimental effects. Similarly, small pore sizes are considered to be very desirable for filter materials and some types of packaging materials.

U.S. Pat. No. 3,228,896 discloses a method of making a microporous polyolefin article by molding a plasticized polyolefin into thin sections, and contacting the molded material with a solvent for at least one of the plasticizers employed.

U.S. Pat. No. 3,351,495 discloses a process of producing a battery separator sheet material having a relatively low pore size and satisfactory electrical resistance characteristics. The sheet is made from a high molecular weight polyolefin having an average molecular weight of at least 300,000, a standard load melt index of substantially 0, and a reduced viscosity of not less than 4. The aforementioned sheet is manufactured by extruding the high molecular weight polyolefin in admixture with an inert filler and a plasticizer, and subsequently extracting the plasticizer by the use of a suitable solvent.

U.S. Pat. No. 3,536,796 discloses a process similar to U.S. Pat. No. 3,351,495 but involving a two-stage solvent extraction in which the plasticizer is first extracted with a solvent for the plasticizer and subsequently the filler extracted with a solvent for the filler.

U.S. Pat. No. 4,024,323 discloses a battery separator formed of a blend of polymeric constituents manufactured by extruding the blend together with a plasticizer which is subsequently removed by the use of a suitable solvent.

In the processes described in each of the aforementioned patents, the plasticizer is removed by an extraction process utilizing a solvent for the plasticizer. Such a process requires subsequent separation of the solvent and plasticizer by suitable distillation or other techniques, which necessitates a large capital investment in equipment. In addition, such separation techniques are energy intensive. Furthermore, the commercially attractive processes involve the use of plasticizers soluble in organic solvents, and when organic solvents are employed environmental problems may arise which require expensive techniques to overcome.

SUMMARY OF THE PRESENT INVENTION

It is an object of the present invention to provide a process for manufacturing a microporous sheet material which obviates the need for an organic solvent extraction step, and expensive solvent separation techniques and environmental controls.

These and other objectives are attained by plasticating a blend of a polyolefin, silica and a liquid plasticizer which is water-insoluble, forming a sheet from the plasticated blend, and subsequently contacting the extruded sheet with water to remove an amount of the plasticizer from the sheet sufficient to render the sheet microporous.

DESCRIPTION OF PREFERRED EMBODIMENTS

It has been discovered that, contrary to the teachings in the aforementioned U.S. Patents, a microporous sheet material may be manufactured by removal of a plasticizer contained in the sheet material by contacting the sheet with a non-solvent for the plasticizer.

It is unexpected that the plasticizer could be removed by a non-solvent therefor. The reason for this phenomenon is not completely understood; however, it is believed that by including finely divided silica as a filler material in the sheet composition, the silica attracts the water to which the sheet is exposed and, since the plasticizer is substantially insoluble in water, it is in turn displaced from the sheet. It has been noted that this phenomenon takes place in a relatively short period of time; i.e., the plasticizer is removed by the non-solvent in a much shorter period of time than has been noted with solvent extraction of plasticizers.

The polyolefin employed in the present process may be any crystalline homopolymer or copolymer of a monoolefin having from two or four carbon atoms; i.e., ethylene, propylene and butylene, preferably homopolymers and copolymers of ethylene and propylene, and most preferably high density polyethylene and substantially isotactic polypropylene. Mixtures of such polyolefins may also be employed.

Blends of polyolefins, such as those described in U.S. Pat. No. 4,024,323, are also useful in practicing the process disclosed herein.

All or a portion of the polyolefin constituent may be an ultra-high molecular weight polyolefin, such as described in U.S. Pat. No. 3,351,495, preferably high density polyethylene or substantially isotactic polypropylene homopolymers having a standard load melt index of less than about 0.04 per ten minutes, and preferably 0, when measured in accordance with ASTM D 1238-70, and having an intrinsic viscosity greater than about 3.0.

If such ultra-high molecular weight polyolefins are employed they may have blended therewith a compatible low molecular weight polyolefin; i.e., a polyolefin with a standard load melt index greater than 0 and preferably greater than about 10 g. per 10 min., and/or an intrinsic viscosity less than about 3.0, and preferably less than about 2.0.

There may also be employed as part of the polyolefin constituent a polyolefin copolymer containing from about 1% up to about 10% by weight of an ethylenically unsaturated monocarboxylic acid selected from the group consisting of acrylic acid, methacrylic acid and mixtures thereof. The olefin component of the polyolefin copolymer may be either a single olefin or a mixture of olefins (terpolymer). The polyolefin copolymers thus referred to are more fully described in U.S. Pat. No. 4,024,323.

The silica component of the present invention should be finely divided, by which is meant that it have a specific surface area greater than about 100 m²/g, as measured by nitrogen absorption, the largest dimension of substantially all of the particles being between about 0.001 and about 0.1 micron. The silica employed must be hydrophilic; i.e., have surface silanol groups. Such silicas may be prepared by precipitation from water glass or other conventional techniques, and are described, for example, in U.S. Pat. No. 3,156,666.

The plasticizer employed in the present process is substantially insoluble in the extracting medium. In the preferred embodiment disclosed herein, the extracting medium is water and, therefore, the plasticizer is substantially insoluble in water. However, as will be appreciated from an understanding of the entire disclosure contained herein, an extracting medium other than water could be employed wherein the plasticizer is selected to be substantially insoluble therein and in which a filler material is employed in the extrusion blend which would promote the absorption of the non-solvent into the sheet formed from the plasticated blend.

By "substantially" insoluble in water it is intended to mean that the plasticizer is soluble in water to the extent of less than about 1% by weight and preferably less than about 0.1% by weight, at 30° C.

The density of the plasticizer preferably is sufficiently different from that of water (or other non-solvent) to facilitate separation therefrom, such as, for example, by decantation. However, it is possible to use plasticizers having a density sufficiently close to water (or other non-solvent) to require separation by distillation, although obviously such separation is more expensive than decantation.

The plasticizer chosen for use in the present process should be chemically and thermally stable, and should not volatilize, at extrusion temperatures.

While the material to be partially or wholly extracted from the sheet produced by the process described herein has been referred to as a "plasticizer", it should be noted that in fact such materials would not be considered "good" plasticizers for the polyolefin polymers employed. While the physical chemistry involved in plasticizer technology is complex and beyond the scope of this disclosure, a "good" plasticizer may be thought of as a permanent diluent in a homogenous, solid resin solution. A good plasticizer is "compatible" with the polymer it plasticizes; i.e., it has a molecular configuration and size that does not greatly distort or interfere with the polymer's configuration, and establishes van der Waal forces with the polymer molecule so that it is not forced out of the extruded polymer-plasticizer blend upon cooling. The plasticizers described herein, while performing the role of a plasticizer during extrusion (i.e., they improve the processability of the polyolefin polymer), do not act as a "good" plasticizer for the polyolefin since, upon cooling, they have a tendency to migrate (bloom) to the surface of the extruded sheet.

It has been found that a particular family of liquid, water-insoluble plasticizers are eminently suitable for practicing the process of the present invention. These preferred plasticizers employed in the process described herein are dialkyl phthalates and dialkyl adipates, particularly those having from about two to about eleven carbon atoms and preferably between about seven and about eleven carbon atoms in the oxo-alcohol moiety. The number of carbon atoms in each of the oxo-alcohol moieties may be the same number or different numbers within the aforementioned carbon atom range, and mixtures of dialkyl phthalates having different numbers of carbon atoms within the aforementioned range in their oxo-alcohol moiety may likewise be employed.

Other conventional additives such as antioxidants, wetting agents and other fillers may also be employed in the extrusion mixture of the present invention, such as, for example, those additives described in U.S. Pat. No. 3,351,495.

The polyolefin component of the extrusion blend desirably should comprise between about 4% and about 20% by weight of the blend. By "polyolefin component" is meant either a single polyolefin, as herein described, or a mixture of several of the polyolefins herein described. The silica component desirably should comprise between about 15% and about 50% by weight of the blend. The water insoluble plasticizer desirably comprises between about 30% and about 80% by weight of the blend. Other components may, optionally, comprise up to about 10% by weight of the blend and are used in conventional amounts.

The components of the extrusion mixture are blended together prior to plastication. The polyolefin component is normally blended with the silica, and the liquid plasticizer subsequently added thereto.

The extrusion mixture is then plasticated and formed into a sheet as, for example, by extrusion through a die to provide a sheet which, in the case of a battery separator, may have ribs or dimples on one or both sides thereof. While the preferred extruded product is in sheet form, the product could be extruded in the form of a tube or other shape.

The extruded sheet may be calendered immediately after extrusion to reduce the thickness of the sheet and provide additional uniformity of web thickness across the width thereof. The sheet may be embossed during or after calendering to provide ribs, dimples, or other desired embossed configurations.

While the sheet is preferably formed by extrusion through a die, as just described, the blend may be plasticated and formed into a sheet by other conventional techniques such as calendering or molding.

The sheet is then contacted with water for a period of time sufficient to remove an amount of the plasticizer sufficient to render the sheet microporous. By "microporous" it is intended to mean a sheet having an average pore size of less than about one micron in diameter, preferably with greater than about 50% of the pores being 0.5 micron or less in diameter. The pore size referred to is measured by the mercury intrusion method described in Ind. Eng. Chem. Anal. Ed., 17,787 (1945). Desirably, at least 30% by weight of the plasticizer is removed from the sheet during such contact; up to 100% may be removed although it has been found desirable to leave up to about 20% by weight of the plasticizer in the sheet. The temperature of the water with which the sheet is contacted may range from about room temperature (about 20° C.) up to the boiling point of water (100° C.).

The sheet is subsequently removed from contact with the water and dried at an appropriate temperature that is not so elevated as to detrimentally affect the properties of the sheet. In general, it is preferred to carry out the drying at temperatures between about 25° C. and about 180° C.

After contact with water there may remain a residual portion of plasticizer on one or both surfaces of the sheet in the form of a thin, low viscosity liquid film. This film may be removed by any satisfactory conventional removal technique, such as brushing, wiping, steam blowing, etc. Such removal may be effected prior to or after the sheet is removed from contact with water.

As mentioned, the sheet material thus produced is very useful as a battery separator since it has good electrical resistance characteristics. Commerically acceptable separators should have an electrical resistance less than about 100 milliohms per square inch. Most commerically available separators appear to have an electrical resistance between about 20 and about 75 milliohms per square inch. The separators of the present invention have an electrical resistance between about 10 and about 80 milliohms per square inch for a 6 mil thick sheet.

The sheet material of the present invention may be made in any thickness desired for a particular use, and it has been found that use of the plasticizers described permit the sheet to be calendered down to thicknesses of about 3 mils or less.

The following specific examples illustrate various aspects of the present invention, and are not to be construed as limiting the scope of the invention beyond that set forth in the claims attached hereto.

EXAMPLE 1

An ultra-high molecular weight polyethylene homopolymer (Hercules 1900 manufactured by Hercules) having a melt index of 0 and a low molecular weight polyethylene homopolymer (Super Dylan 7180 manufactured by Sinclair Koppers Co.) having a melt index of 18 g. per 10 min. were employed as the polyolefin in this example. The plasticizer was Santicizer 711, a dialkyl phthalate manufactured by Monsanto wherein the oxo-alcohol moiety thereof is composed of $C_7$ alcohol (30%), $C_9$ alcohol (40%) and $C_{11}$ alcohol (30%). Santicizer 711 has a solubility in water of less than 0.01% by weight. A blend was prepared containing the following components:

80 grams of Hi Fax 1900
100 grams of Super Dylan 7180
600 grams of silica (Hisil 233)
5 grams of lead stearate
1200 cc of Santicizer 711

The dry ingredients were blended together in a Henschel high intensity mixer and the Santicizer 711, which is a liquid, was added while the mixing was in progress.

The blend was fed into the hopper of a twin screw extruder (ZSK, by Werner Pfliederer) and extruded through a die to form a continuous web 10 inches wide and approximately 30 mils thick. The extruded web was passed through the nip of a calender at a nip temperature of about 300° F. and the web thickness reduced therein to about 6 mils. The web was then passed through a water bath at a water temperature of 100° C. The web was in contact with the water for 10 minutes during which time a weight loss of 39% of the web occurred due to the removal of the plasticizer by the water. The web was dried at a temperature of 176° C. and cut into sheets 10.5 inches by 6.16 inches. The resulting microporous sheets had the following characteristics:

| | |
|---|---|
| Electrical resistance (10 min.): | 0.020 milliohms per sq. in. |
| Tensile strength (cross machine direction): | 376 psi (30 cm/m) |
| Elongation (cross machine direction): | 191% (30 cm/m) |
| Peroxide oxidation: Elongation at: | |
| 16 hours | 110% |
| 40 hours | 156% |

EXAMPLE 2

The procedure of Example 1 was repeated except that the following plasticizers were substituted for Santicizer 711:

A. Dioctyl adipate (solubility in water: 0.01% at 25° C.)
B. Diundecyl phthalate (solubility in water: practically insoluble at 25° C.)

The resulting microporous sheets had the following characteristics:

| | A | B |
|---|---|---|
| Electrical resistance (10 min), milliohms per square inch: | 0.023 | 0.036 |
| Tensile strength (cross machine direction): | 472% | 507% |
| Elongation (cross machine direction): | 239% | 274% |
| Peroxide Oxidation Elongation at: | | |
| 16 hours | 22% | 349% |
| 40 hours | 0% | 97% |

EXAMPLE 3

The procedure of Example 1 was repeated except that Santicizer 97 (Monsanto) was substituted for Santicizer 711. Santicizer 97 is a dialkyl adipate where the oxo-alcohol moiety is composed of mixed $C_7$ and $C_9$ (predominantly linear) alkyl groups. Santicizer 97 is practically insoluble in water at 25° C. The resulting sheet was microporous and had an electrical resistance of 0.010 ohms per square meter.

I claim:

1. A process of manufacturing a microporous sheet comprising: plasticating a blend comprising a polyolefin selected from the group consisting of homopolymers and copolymers of ethylene, propylene and buylene, and mixtures thereof; finely divided silica; and a substantially water-insoluble plasticizer selected from the group consisting of dialkyl phthalates and dialkyl adipates having between about two to eleven carbon atoms in the oxo-alcohol moiety; forming a sheet from the plasticated blend; and contacting the sheet with water for a period of time sufficient to remove an amount of the plasticizer from the sheet sufficient to render the sheet microporous.

2. The process of claim 1 wherein the polyolefin is selected from the group consisting of high-density polyethylene and substantially isotactic polypropylene.

3. The process of claim 2 wherein the polyolefin is high-density polyethylene having a standard load melt index of substantially 0.

4. The process of claim 1 where the polyolefin comprises between about 4% and about 20% by weight of the blend, the silica comprises between about 15% and about 50% by weight of the blend, and the plasticizer comprises between about 30% and about 80% by weight of the blend.

5. The process of claim 1 wherein the polyolefin component is a mixture of high-density polyethylene having a standard load melt index of substantially 0 and a high-density polyethylene having a standard load melt index greater than about 10 g. per 10 min.

6. The process of claim 5 wherein the polyethylene having a substantially 0 melt index comprises between about 30% and about 60% by weight of the polyolefin component.

7. The process of claim 1 wherein the plasticizer has a solubility in water of less than about 0.1% by weight at 30° C.

8. The process of claim 1 wherein the finely divided silica is hydrophilic, has a specific surface area greater than about 100 m$^2$/g, as measured by nitrogen absorption, and a particle size between about 0.001 and about 0.1 micron.

9. The process of claim 1 wherein the plasticizer has between about 7 and about 11 carbon atoms in the oxo-alcohol moiety.

10. The process of claim 1 wherein the sheet, after contact with the water, is subjected to a surface treatment to remove any film of plasticizer adhering thereto.

11. The process of claim 1 wherein the temperature of the water is between about 20° C. and about 100° C.

12. The process of claim 1 wherein the plasticizer has a density sufficiently different from water to permit separation from water by decantation.

13. The process of claim 12 wherein the plasticizer is removed from the water by decantation.

14. The process of forming a microporous battery separator comprising: plasticating a blend comprising a polyolefin selected from the group consisting of homopolymers and copolymers of ethylene, propylene and buylene, and mixtures thereof; finely divided silica; and a substantially water-insoluble plasticizer selected from the group consisting of dialkyl phthalates and dialkyl adipates having between about 2 and about 11 carbon atoms in the oxo-alcohol moiety; forming a sheet from the plasticated blend; contacting the sheet with water for a period of time sufficient to remove an amount of the plasticizer from the sheet sufficient to render the sheet microporous; drying the sheet; and cutting the sheet into a size suitable for separating the plates in a battery.

* * * * *